(12) United States Patent
Murakami

(10) Patent No.: US 10,391,999 B2
(45) Date of Patent: Aug. 27, 2019

(54) CONTROL APPARATUS FOR DIESEL ENGINE

(71) Applicant: TOYOTA JIDOSHA KABUSHIKI KAISHA, Toyota-shi, Aichi-ken (JP)

(72) Inventor: Koji Murakami, Suntou-gun (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/664,407

(22) Filed: Jul. 31, 2017

(65) Prior Publication Data

US 2018/0086329 A1 Mar. 29, 2018

(30) Foreign Application Priority Data

Sep. 23, 2016 (JP) .................................. 2016-185429

(51) Int. Cl.
*B60W 20/10* (2016.01)
*B60K 6/485* (2007.10)
(Continued)

(52) U.S. Cl.
CPC ............. *B60W 20/10* (2013.01); *B60K 6/485* (2013.01); *B60W 10/06* (2013.01); *B60W 10/08* (2013.01); *B60W 30/192* (2013.01); *F02D 9/08* (2013.01); *F02D 41/0002* (2013.01); *F02D 41/042* (2013.01); *F02D 41/08* (2013.01); *F02D 41/3005* (2013.01); *F02N 11/0814* (2013.01); *B60W 2510/0671* (2013.01); *B60W 2710/0605* (2013.01); *B60W 2710/0627* (2013.01);
(Continued)

(58) Field of Classification Search
CPC ...... B60W 20/10; B60W 10/06; B60W 10/08; B60W 30/192; B60W 2510/0671; B60W 2710/0605; B60W 2710/0627; B60W 2710/0644; B60W 2710/081; B60W 2710/083; B60K 6/485; F02D 9/08; F02D 41/0002; F02D 41/042; F02D 41/08; F02D 41/3005; F02D 2041/0022; F02D 2200/0406; F02D 2200/101; F02D 2250/24; F02D 2250/28; F02N 11/0814; B60Y 2200/92; Y10S 903/903
See application file for complete search history.

(56) References Cited

U.S. PATENT DOCUMENTS 6,315,068 B1 * 11/2001 Hoshiya .................. B60K 6/48
180/65.25

FOREIGN PATENT DOCUMENTS

EP 2 075 444 A1 7/2009
JP 2003-314321 11/2003
(Continued)

*Primary Examiner* — Calvin Cheung
(74) *Attorney, Agent, or Firm* — Finnegan, Henderson, Farabow, Garrett & Dunner, LLP

(57) ABSTRACT

A control apparatus includes a diesel engine having a throttle valve and a fuel injection valve, an electric driving machine that assists in drive of the engine, and a controller configured to stop the engine automatically when a first condition for automatically stopping the engine is established during an operation of the engine. At this time, the controller is configured to operate the throttle valve to a closing side in response to establishment of a second condition that is established prior to establishment of the first condition, and stop supply of fuel by the fuel injection valve in response to subsequent establishment of the first condition.

6 Claims, 8 Drawing Sheets

(51) Int. Cl.

|  |  |
|---|---|
| *B60W 10/06* | (2006.01) |
| *B60W 10/08* | (2006.01) |
| *F02D 9/08* | (2006.01) |
| *F02D 41/08* | (2006.01) |
| *F02D 41/30* | (2006.01) |
| *F02D 41/04* | (2006.01) |
| *F02N 11/08* | (2006.01) |
| *F02D 41/00* | (2006.01) |
| *B60W 30/192* | (2012.01) |

(52) U.S. Cl.
CPC ............... *B60W 2710/0644* (2013.01); *B60W 2710/081* (2013.01); *B60W 2710/083* (2013.01); *B60Y 2200/92* (2013.01); *F02D 2041/0022* (2013.01); *F02D 2200/0406* (2013.01); *F02D 2200/101* (2013.01); *F02D 2250/24* (2013.01); *F02D 2250/28* (2013.01); *Y02T 10/42* (2013.01); *Y02T 10/48* (2013.01); *Y02T 10/6226* (2013.01); *Y02T 10/6286* (2013.01); *Y02T 10/7258* (2013.01); *Y10S 903/903* (2013.01)

(56) References Cited

FOREIGN PATENT DOCUMENTS

| JP | 2009-156091 | 7/2009 |
| JP | 2010-120472 | 6/2010 |

* cited by examiner

CONTROL APPARATUS FOR DIESEL ENGINE

FIELD

The present disclosure relates to a control apparatus for a diesel engine.

BACKGROUND

Conventionally, JP 2009-156091 A, for example, has disclosed the art of restraining vibration of an internal combustion engine when the internal combustion engine is stopped. In this art, at the time of the engine stop conditions being established, supply of fuel to the combustion chamber is stopped when the pressure in the intake passage drops below a predetermined value after the throttle valve and the EGR valve are fully closed. Thereby, torque variation accompanying compression and expansion of intake air is restrained from occurring when supply of fuel is stopped, and therefore vibration of the internal combustion engine is restrained.

Following is a list of patent literatures which the applicant has noticed as background arts of embodiments the present disclosure.

Patent Literature 1: JP 2009-156091 A
Patent Literature 2: JP 2003-314321 A
Patent Literature 3: JP 2010-120472 A

SUMMARY

However, in the above described conventional art, the throttle valve is fully closed after the stop conditions of the engine are established, and therefore, the period after the engine stop conditions are established until supply of fuel to the combustion chamber is actually stopped becomes long. Consequently, the above described conventional art has a room for improvement in the view point of enhancement of fuel efficiency.

The present disclosure is made in the light of the problem as described above, and an object of the present disclosure is to provide a control apparatus for a diesel engine that can further improve fuel efficiency while restraining vibration of the engine at a time of automatic stop in the diesel engine that automatically stops the engine when predetermined automatic stop conditions are established during an operation of the engine.

In order to attain the above described object, a first disclosure is a control apparatus for a diesel engine that includes a diesel engine having a throttle valve that is disposed in an intake passage and a fuel injection valve that supplies fuel into a cylinder, an electric driving machine that assists in drive of the engine, and a controller configured to stop the engine automatically when a first condition for automatically stopping the engine is established during an operation of the engine. The controller is configured to operate the throttle valve to a closing side in response to establishment of a second condition that is established prior to establishment of the first condition, and stop supply of fuel by the fuel injection valve in response to subsequent establishment of the first condition.

A second disclosure is such that in the first disclosure, the second condition is a condition that is established when it is determined that the first condition is established after a predetermined time period.

A third disclosure is such that in the first disclosure, the predetermined time period is a time period that is required until an intake pipe pressure becomes a predetermined negative pressure after the throttle valve is operated to the closing side.

A fourth disclosure is such that in the first disclosure, the controller is configured to control torque in a period until the first condition is established after the second condition is established, by the electric driving machine.

A fifth disclosure is such that in the first disclosure, the controller is configured to operate the throttle valve to an opening side, and drive the electric driving machine until an intake pipe pressure reaches a first threshold value, when the second condition changes to be non-established in a period until the first condition is established after the second condition is established.

A sixth disclosure is such that in the first disclosure, the controller is configured to stop supply of fuel by the fuel injection valve, and drive the electric driving machine to keep the engine at a predetermined engine speed, when an intake pipe pressure becomes lower than a second threshold value in a period until the first condition is established after the second condition is established.

A seventh disclosure is such that in a sixth disclosure, a value of the predetermined engine speed is smaller than a value of an idling engine speed in an operation of the engine.

According to the first disclosure, the throttle valve is operated to the closing side in response to establishment of the second condition that is established prior to establishment of the first condition. Thereby, the intake pipe pressure can be reduced prior to establishment of the first condition, and therefore, supply of fuel can be quickly stopped in response to establishment of the first condition. Thereby, it becomes possible to achieve further improvement of fuel efficiency while restraining vibration at the time of stop of the diesel engine.

According to the second disclosure, the second condition is the condition that is established when it is determined that the first condition is established after the predetermined time period. Thereby, the operation of reducing the intake pipe pressure can be started from a time point which is the predetermined time period before a time point at which the first condition is established.

According to the third disclosure, the intake pipe pressure can be made the predetermined negative pressure when supply of the fuel is stopped in response to establishment of the first condition. Thereby, it becomes possible to achieve further improvement of fuel efficiency while restraining vibration at the time of stop of the diesel engine.

According to the fourth disclosure, the torque in the period until the first condition is established after the second condition is established is controlled by the electric driving machine. Thereby, torque in a period in which the throttle valve is operated to the closing side in response to establishment of the second condition can be ensured by the electric driving machine.

According to the fifth disclosure, when the second condition changes to be non-established in the period until the first condition is established after the second condition is established, the throttle valve is operated to the opening side, and the electric driving machine is driven until the intake pipe pressure reaches the first threshold value. Thereby, it becomes possible to supplement insufficient torque in the period until the reduced intake pipe pressure is restored by the electric driving machine.

According to the sixth disclosure, when the intake pipe pressure becomes lower than the second threshold value in the period until the first condition is established after the second condition is established, supply of the fuel is stopped, and the engine speed is kept at the predetermined engine speed by the electric driving machine. Thereby, it becomes possible to keep the engine speed in the period until the first condition is established by the electric driving machine, even with the intake pipe pressure that makes stable combustion difficult.

According to the seventh disclosure, the predetermined engine speed by the electric driving machine is at a value lower than the idling engine speed during the engine operation. Thereby, power consumption by the electric driving machine is reduced, and contribution can be made to enhancement of fuel efficiency.

DETAILED DESCRIPTION

Hereunder, embodiments of the present disclosure will be described with reference to the drawings. Note that when the numerals of the numbers, the amounts, the quantities, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures, steps and the like that are described in the embodiments shown as follows are not always indispensable to the disclosure unless specially explicitly shown otherwise, or unless the disclosure is explicitly specified by the structures, steps and the like theoretically.

First Embodiment

[Configuration of First Embodiment]

Figure 1:
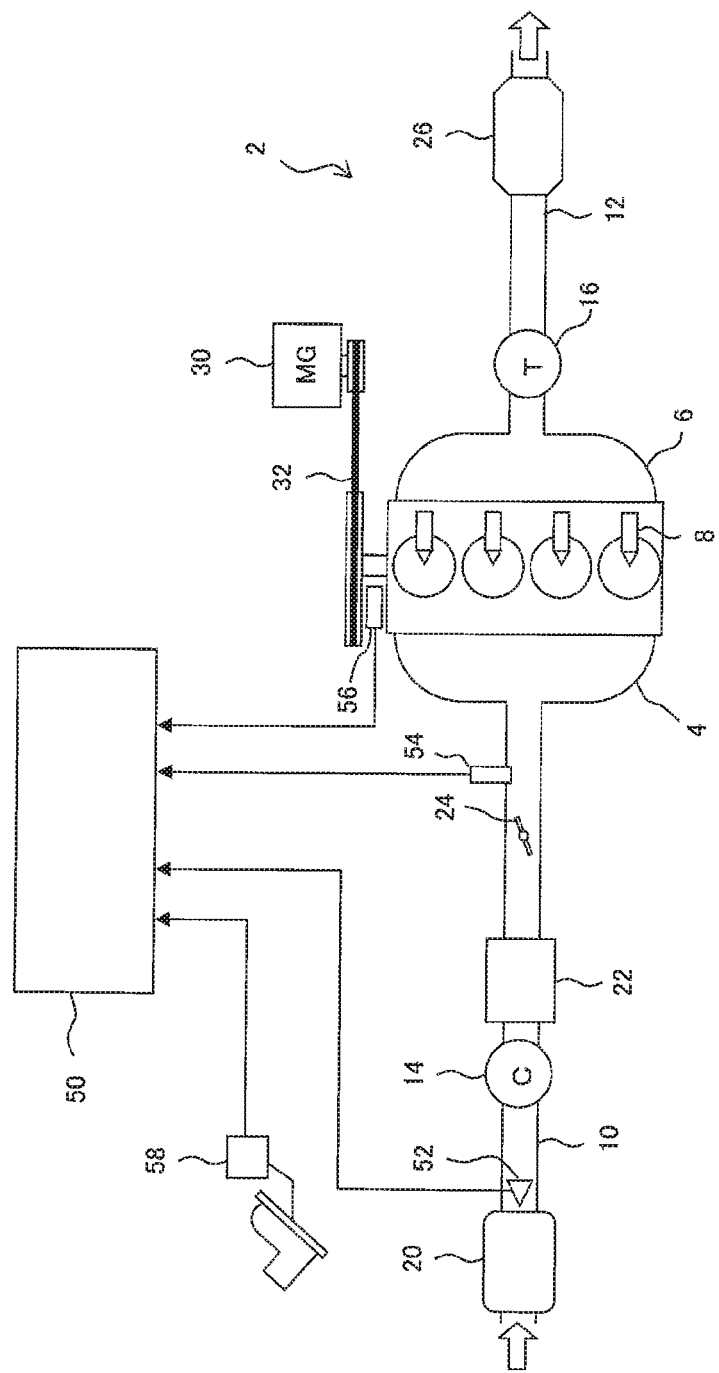
FIG. 1 is a diagram illustrating a configuration of an engine system to which a controller of a first embodiment of the present disclosure is applied.

FIG. 1 is a diagram illustrating a configuration of an engine system to which a controller of a first embodiment of the present disclosure is applied. An internal combustion engine according to the present embodiment is a diesel engine (hereunder, simply referred to as an "engine") equipped with a turbocharger. The engine is mounted on a vehicle as a power source. A main body 2 of the engine is equipped with four cylinders in series, and a fuel injection valve 8 is provided at each of the cylinders. To the engine main body 2, an intake manifold 4 and an exhaust manifold 6 are mounted. An intake passage 10 in which fresh air that is taken in from an air cleaner 20 flows is connected to the intake manifold 4. A compressor 14 of a turbocharger is attached to the intake passage 10. A throttle valve 24 is provided downstream of the compressor 14 in the intake passage 10. An intercooler 22 is equipped between the compressor 14 and the throttle valve 24 in the intake passage 10. An exhaust passage 12 for releasing exhaust gas that flows out of the engine main body 2 into the atmosphere is connected to the exhaust manifold 6. A turbine 16 of the turbocharger is attached to the exhaust passage 12. A catalyst device 26 for purifying exhaust gas is provided downstream of the turbine 16 in the exhaust passage 12.

The engine according to the present embodiment includes a motor generator (hereunder, also referred to as "MG") 30. The MG 30 is connected to a crankshaft of the engine via a belt 32. The MG 30 has a function as a generator that performs power generation by torque of the crankshaft that is transmitted via the belt 32. Further, the MG 30 also has a function as an electric motor that transmits torque to the crankshaft via the belt 32. Note that a power transmission mechanism between the MG 30 and the crankshaft is not limited to the belt 32, but may be power transmission by gears or power transmission by direct connection.

The engine system according to the present embodiment includes an ECU (Electronic Control Unit) 50. The ECU 50 is a controller that comprehensively controls a whole of the engine system, and the controller according to the present disclosure is embodied as one function of the ECU 50.

The ECU 50 takes in and processes signals of sensors which are included by the engine system. The sensors are attached to respective spots in the engine system. An air flow meter 52 for detecting an actual fresh air amount is attached to the intake passage 10 downstream of the air cleaner 20. An intake pipe pressure sensor 54 for detecting an intake pipe pressure is attached to the intake passage 10 downstream of the throttle valve 24. Further, a rotation speed sensor 56 that detects a rotation speed of the crankshaft, an accelerator position sensor 58 that outputs a signal corresponding to a depressed amount of an accelerator pedal and the like are also attached. The ECU 50 processes the signals of the respective sensors which are taken in, and operates respective actuators in accordance with a predetermined control program. The actuators that are operated by the ECU 50 include the fuel injection valves 8, the throttle valve 24 and the like. Note that a number of actuators and sensors that are connected to the ECU 50 are present except for the actuators and the sensors illustrated in the drawings, but explanation of those actuators and sensors will be omitted in the present description.

[Operation of First Embodiment]

Engine control executed by the ECU 50 includes S&S (Stop & Start) control. S&S control in the present embodiment is control that stops supply of fuel to the engine by fuel cut (hereunder, also referred to as "F/C") by receiving a stop request for automatically stopping the engine, and performs restart by receiving a subsequent predetermined start request. The stop request here is a request that is issued when conditions that the depressed amount of the accelerator pedal is zero, a brake pedal is depressed, and a vehicle speed is zero, for example, are all established, as automatic stop conditions for automatically stopping the engine. Note that the automatic stop conditions are not limited to the aforementioned conditions, but, for example, states of the vehicle such as an engine water temperature, an oil temperature of AT (Automatic Transmission), an engine speed, and a brake oil pressure, and a brake negative pressure, a state of auxiliary equipment such as an air-conditioner and the like may be added to the conditions.

Here, S&S control of the diesel engine has problems of vibration and noise. That is, in a diesel engine, the intake pipe pressure and a compression ratio during idling are high, and therefore, large vibration and noise occur in a period after supply of fuel is stopped until the engine actually stops by S&S control. Consequently, in the S&S control of a diesel engine, an art has been conventionally known, which performs F/C after reducing the intake pipe pressure when the automatic stop conditions are established. In explaining S&S control of the first embodiment, an operation of conventional S&S will be described as a comparative example first.

Figure 2:
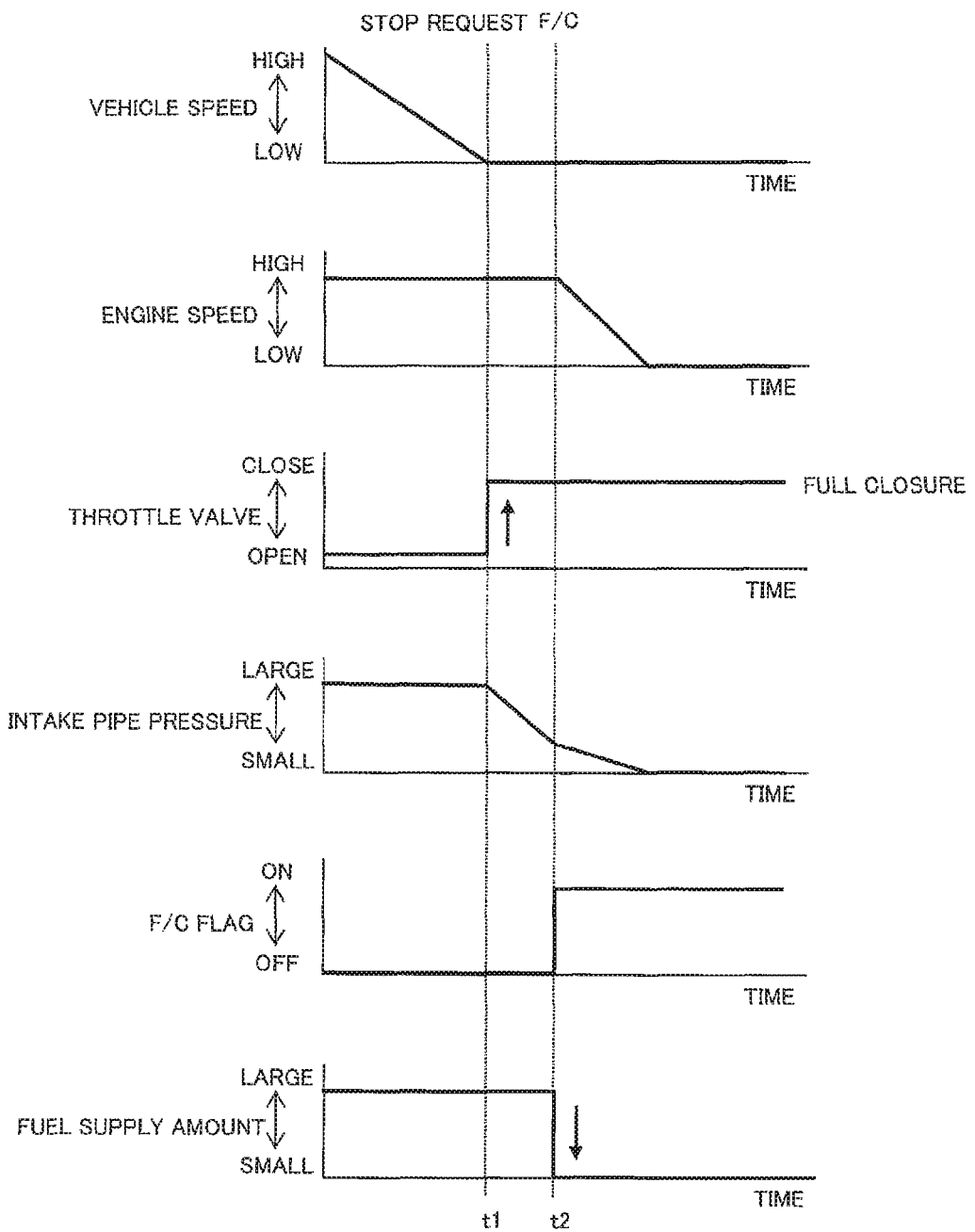
FIG. 2 is a time chart illustrating an operation of S&S control as a comparative example.

FIG. 2 is a time chart illustrating an operation of S&S control as a comparative example. In FIG. 2, a chart on a first row illustrates a temporal change of a vehicle speed of the vehicle, a chart on a second row illustrates a temporal change of an engine speed, a chart on a third row illustrates a temporal change of a closing degree of the throttle valve, a chart on a fourth row illustrates a temporal change of an intake pipe pressure, a chart on a fifth row illustrates a temporal change of a F/C flag, and a chart on a sixth row illustrates a temporal change of a fuel supply amount, respectively.

In the comparative example of the S&S control illustrated in FIG. 2, at a time point t1 at which the vehicle speed becomes zero and the automatic stop conditions are established, the throttle valve is closed to full closure. Thereby, the intake pipe pressure is reduced with time. Then, at a subsequent time point t2, the F/C flag is set, and F/C is performed. When F/C is performed, the engine speed is reduced and the engine is stopped. According to control like this, F/C is performed after the intake pipe pressure is reduced, and therefore, vibration and noise at the time of the engine being stopped are restrained.

However, in the S&S control of the above described comparative example, the time period until the engine is actually stopped after the automatic stop conditions are established is long, and therefore, fuel efficiency is worsened. Thus, in the S&S control of the first embodiment of the present disclosure, the above described problem is solved by performing determination (hereunder, referred to as "S&S predetermination") of establishment of an S&S predetermination condition which is established prior to establishment of the automatic stop conditions. Hereunder, with reference to FIG. 3, the S&S control of the present embodiment will be further described in detail.

Figure 3:
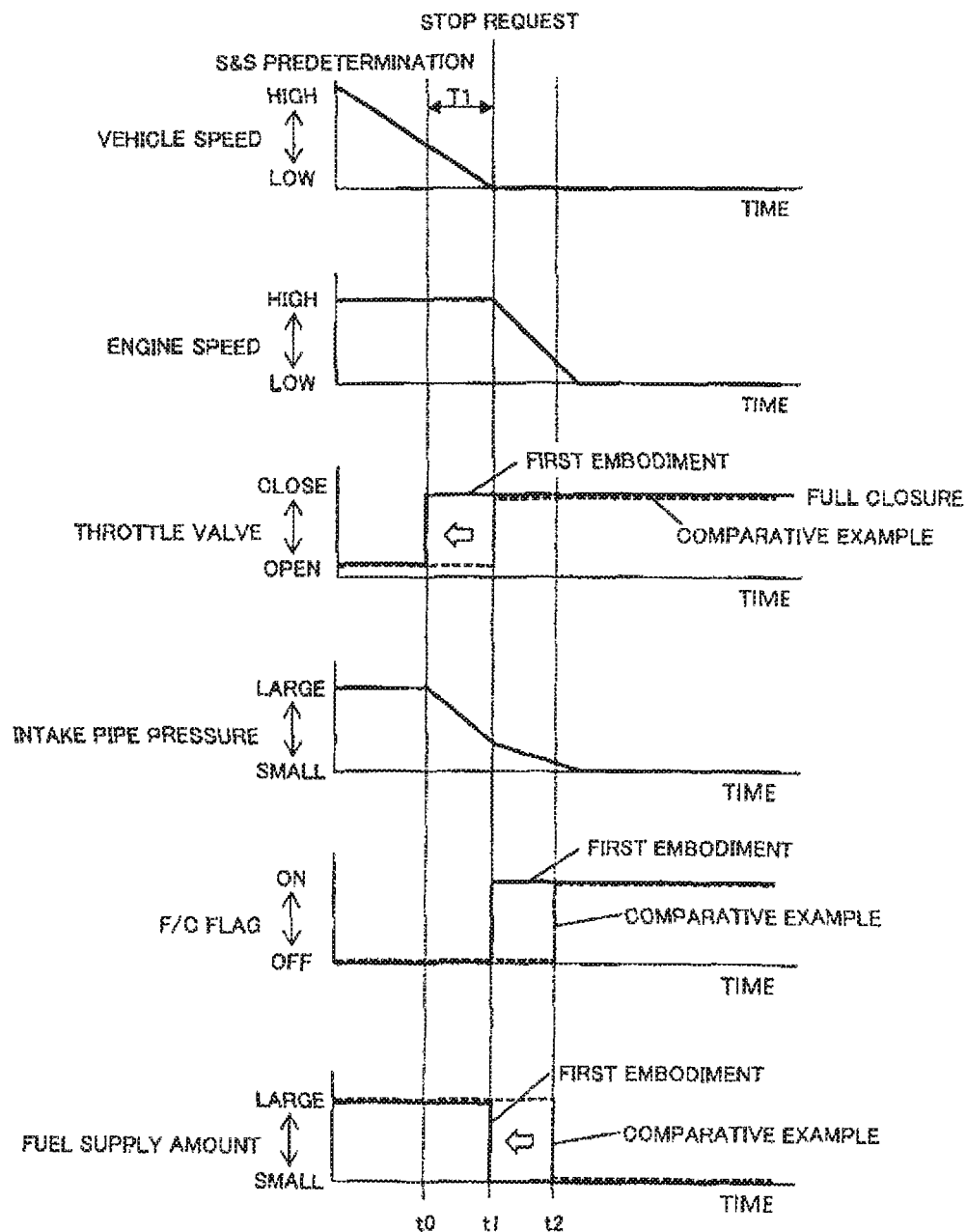
FIG. 3 is a time chart illustrating an operation of S&S control of the first embodiment of the present disclosure.

FIG. 3 is a time chart illustrating an operation of the S&S control of the first embodiment of the present disclosure. In FIG. 3, a chart on a first row illustrates a temporal change of a vehicle speed of a vehicle, a chart on a second row illustrates a temporal change of an engine speed, a chart on a third row illustrates a temporal change of a closing degree of the throttle valve, a chart on a fourth row illustrates a temporal change of an intake pipe pressure, a chart on a fifth row illustrates a temporal change of a F/C flag, and a chart on a sixth row illustrates a temporal change of a fuel supply amount, respectively.

As illustrated in FIG. 3, in the S&S control of the present embodiment, the throttle valve 24 is fully closed at a time point t0 at which the S&S predetermination is affirmative. In the S&S predetermination, it is an S&S predetermination condition that the automatic stop conditions are very likely to be established in the near future (after a predetermined time period T1, for example). The predetermined time period T1 can be made a time period that is required until the intake pipe pressure becomes a predetermined negative pressure or less (a negative pressure to such an extent that large vibration does not occur to the engine main body even when fuel cut is performed) after the throttle valve 24 is closed, for example. The predetermined time period T1 may be a fixed value, or may be determined by using a map of the predetermined time period T1 that is specified by being related to an operating state such as the engine speed.

The S&S predetermination condition is set as the condition that is the condition more easily established than the automatic stop conditions, and is always established when the automatic stop conditions are established. In more detail, when the automatic stop conditions are configured by a plurality of conditions including a condition that the vehicle speed is zero, it is the S&S predetermination condition that, for example, all the conditions except for the vehicle speed are established, and the vehicle is very likely to stop after the predetermined time period T1 to establish the condition of the vehicle speed. Determination of whether the vehicle stops after the predetermined time period T1 can be realized by making it a condition that the vehicle speed has a threshold value or less, and setting the threshold value to be larger as a deceleration becomes higher. As for the deceleration, a value calculated from a change amount of the vehicle speed may be used, or the depressed amount on the brake may be used as a correlation value of the deceleration degree. Further, if the threshold value is set with a margin with respect to the predetermined time period T1, the threshold value may be a fixed value.

Further, as another example of the S&S predetermination condition, a condition relating to an auto air-conditioner is included. In more detail, when the automatic stop conditions are configured by a plurality of conditions including an air-conditioner condition that a present temperature reaches a target temperature which is set, it is made the S&S predetermination condition that the conditions except for the air-conditioner condition are all established, and the air-conditioner condition is very likely to be also established after the predetermined time period T1, for example. The determination of whether the air-conditioner condition is very likely to be established after the predetermined time period T1 can be realized by making it a condition that a temperature difference between the set target temperature and the present temperature have a predetermined value or less in a state in which the auto-air conditioner is on, for example.

When the throttle valve 24 is closed at the time point t0, the intake pipe pressure reduces with a time, and at the time point t1 at which the automatic stop conditions are established, a negative pressure is generated in the intake pipe. At the time point t1, the F/C flag is set, and F/C is performed. According to the operation like this, F/C is performed in the state in which the negative pressure is generated in the intake pipe, so that generation of vibration and noise is restrained. Further, F/C can be started earlier than in the comparative example, and therefore effect of improvement in fuel efficiency is obtained.

In a period from the time point t0 at which the throttle valve 24 is closed to the time point t1 at which F/C is performed, the intake pipe pressure is in a lower state than usual, so that there is a fear that stable torque control becomes difficult. Thus, in the S&S control of the first embodiment of the present disclosure, torque control is performed by using the MG 30 when a torque change request by change of a request torque by the air conditioner or other auxiliary equipment is issued in the period from the time point t0 to the time point t1. In more detail, when the request torque is increased, torque control is performed by generating positive torque from the MG 30. Further, when the request torque is reduced, torque control is performed by generating negative torque by a regeneration operation by the MG 30. Thereby, even when the intake pipe pressure is in a low state, it becomes possible to realize stable torque control.

Further, it is conceivable that even when the S&S predetermination is affirmative, no stop request is issued after the predetermined time period T1. As a situation like this, there is cited a case in which after the S&S predetermination is affirmative, the accelerator is depressed and the engine changes to accelerate. Thus, in the S&S control in the first embodiment, in the case in which the S&S predetermination is made negative by the engine changing to accelerate after the S&S predetermination becomes affirmative, the throttle valve 24 is operated to an opening side, and insufficient torque is supplemented by drive of the MG 30. Hereunder, detailed explanation will be further made with reference to a time chart.

Figure 4:
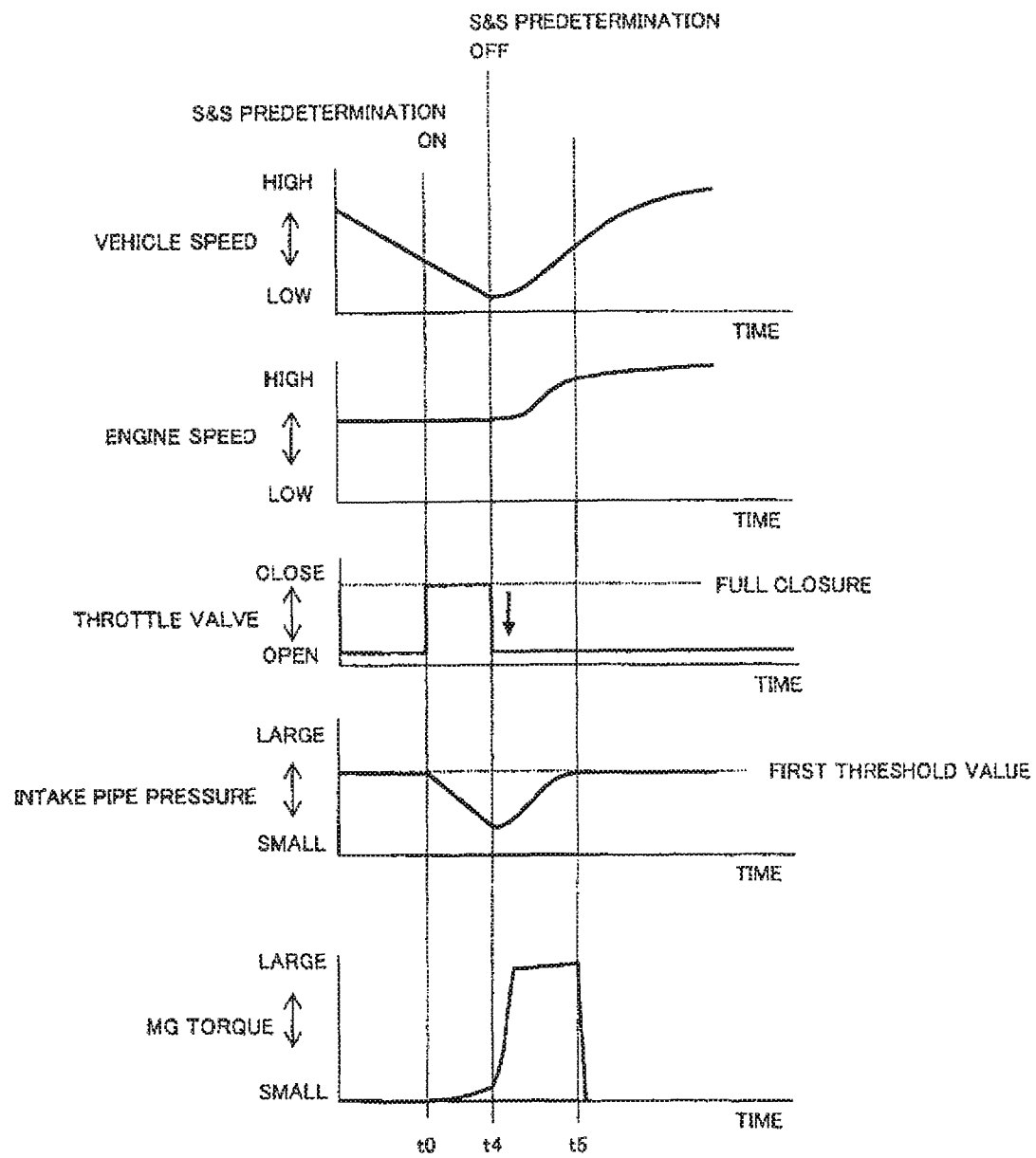
FIG. 4 is a time chart illustrating an operation in a case where S&S predetermination changes to negative from affirmative in the S&S control of the first embodiment of the present disclosure.

FIG. 4 is a time chart illustrating an operation in a case of the S&S predetermination changing to negative from affirmative in the S&S control of the first embodiment of the present disclosure. In FIG. 4, a chart on a first row illustrates a temporal change of the vehicle speed of the vehicle, a chart on a second row illustrates a temporal change of the engine speed, a chart on a third row illustrates a temporal change of the closing degree of the throttle valve, a chart on a fourth row illustrates a temporal change of the intake pipe pressure, a chart on a fifth row illustrates a temporal change of the torque of the MG 30, respectively.

In an example of the S&S control illustrated in FIG. 4, at a time point t0 at which the S&S predetermination is affirmative, the throttle valve 24 is closed to full closure. Subsequently, when the S&S predetermination becomes negative by the engine changing to accelerate at a time point t4, the throttle valve 24 is opened again. However, even when the throttle valve 24 is opened, the intake pipe pressure does not increase immediately, and therefore, torque is supplemented by a torque change operation (hereunder, MG torque change) by drive of the MG 30 in a period until a time point t5 at which the intake pipe pressure increases to a predetermined first threshold value. As the first threshold value here, a value (for example, an atmospheric pressure) that is set in advance as the intake pipe pressure that enables stable torque control is used. According to the operation like this, in the case in which the throttle valve 24 is closed before a stop request by the S&S predetermination, it becomes possible to prevent worsening of drivability due to insufficient torque even if the engine changes to accelerate thereafter.

[Specific Processing in First Embodiment]

Figure 5:
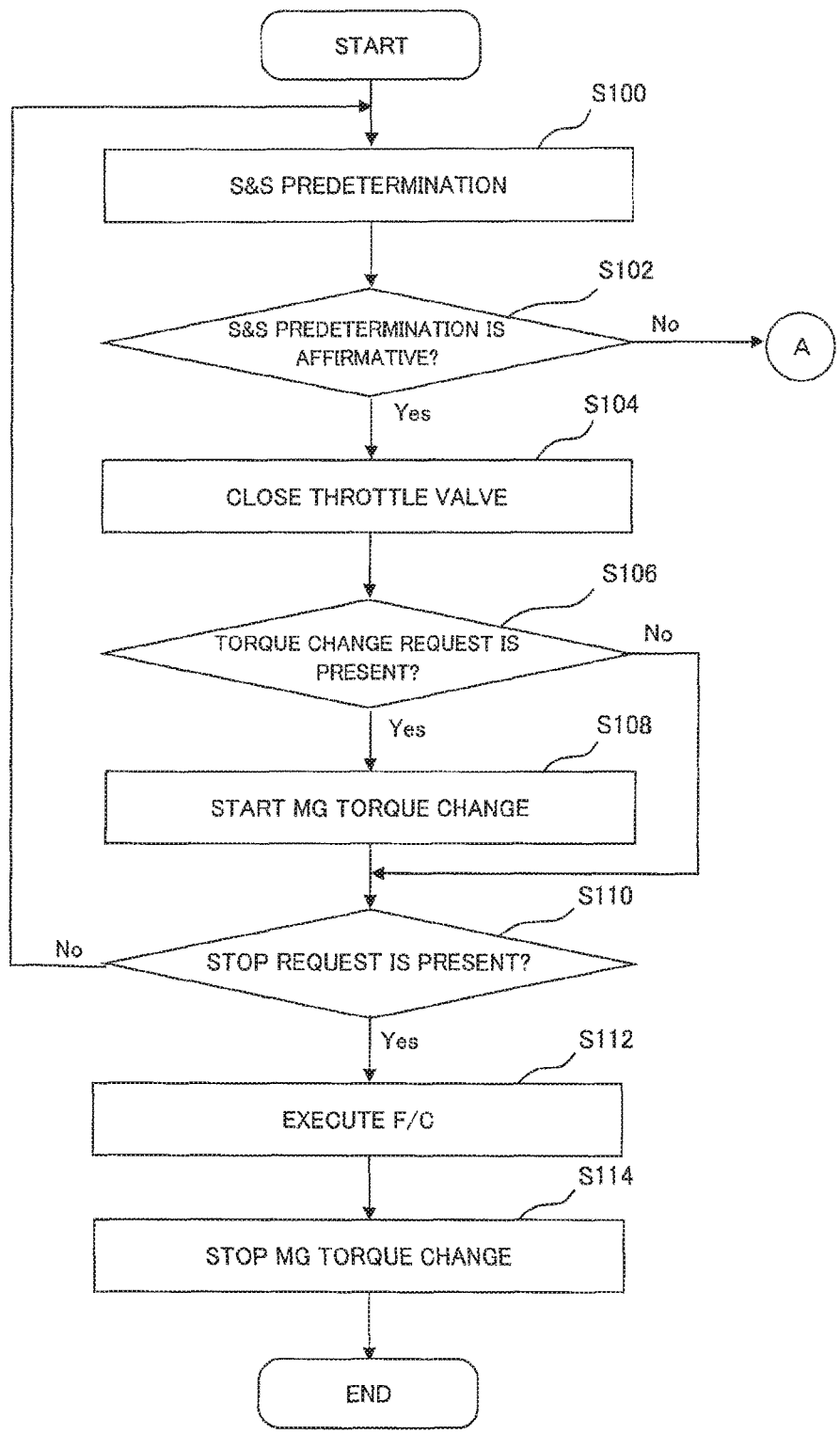
FIG. 5 is a flowchart illustrating a first half part of a routine for the S&S control that is executed by an ECU of the first embodiment of the present disclosure.

Next, specific processing in the aforementioned S&S control will be described in detail by using a flowchart. FIG. 5 is a flowchart illustrating a first half part of a routine for S&S control that is executed by the ECU 50 of the first embodiment of the present disclosure. Further, FIG. 6 is a flowchart illustrating a latter half part of the routine for the S&S control that is executed by the ECU 50 of the first embodiment of the present disclosure.

In step S100 in the routine illustrated in FIG. 5, the S&S predetermination is performed. Here, specifically, the S&S predetermination is regarded as affirmative when the condition of the S&S predetermination is established, and the S&S predetermination is regarded as negative when the condition of the S&S predetermination is not established. In subsequent step S102, it is determined whether or not a result of the S&S predetermination performed in step S100 is affirmative. When it is determined that the result of the S&S predetermination is affirmative as a result, the flow goes to subsequent step S104, and the throttle valve 24 is closed to full closure. In subsequent step S106, it is determined whether or not a torque change request is present. When change in the torque request is not present as a result, the flow goes to step S110 that will be described later, and when a change is present in the torque request, the flow goes to step S108. In step S108, requested torque is realized by MG torque change by drive of the MG 30. In more detail, when the torque request is changed to increase, the requested torque is realized by generating positive torque by drive of the MG 30. Further, when the torque request is changed to decrease, the requested torque is realized by generating negative torque by the regeneration operation of the MG 30.

In subsequent step S110, it is determined whether or not a stop request in the S&S control is present. Here, specifically, it is determined whether or not the automatic stop conditions are established. When it is determined that the automatic stop conditions are not established yet as a result, the flow returns to step S100 again and the S&S predetermination is executed again. Meanwhile, when it is determined that the automatic stop conditions are established in step S110, the flow goes to subsequent step S112. In step S112, F/C is executed and the engine is stopped. Next, in subsequent step S114, MG torque change by drive of the MG 30 is stopped, and the present routine is ended.

Figure 6:
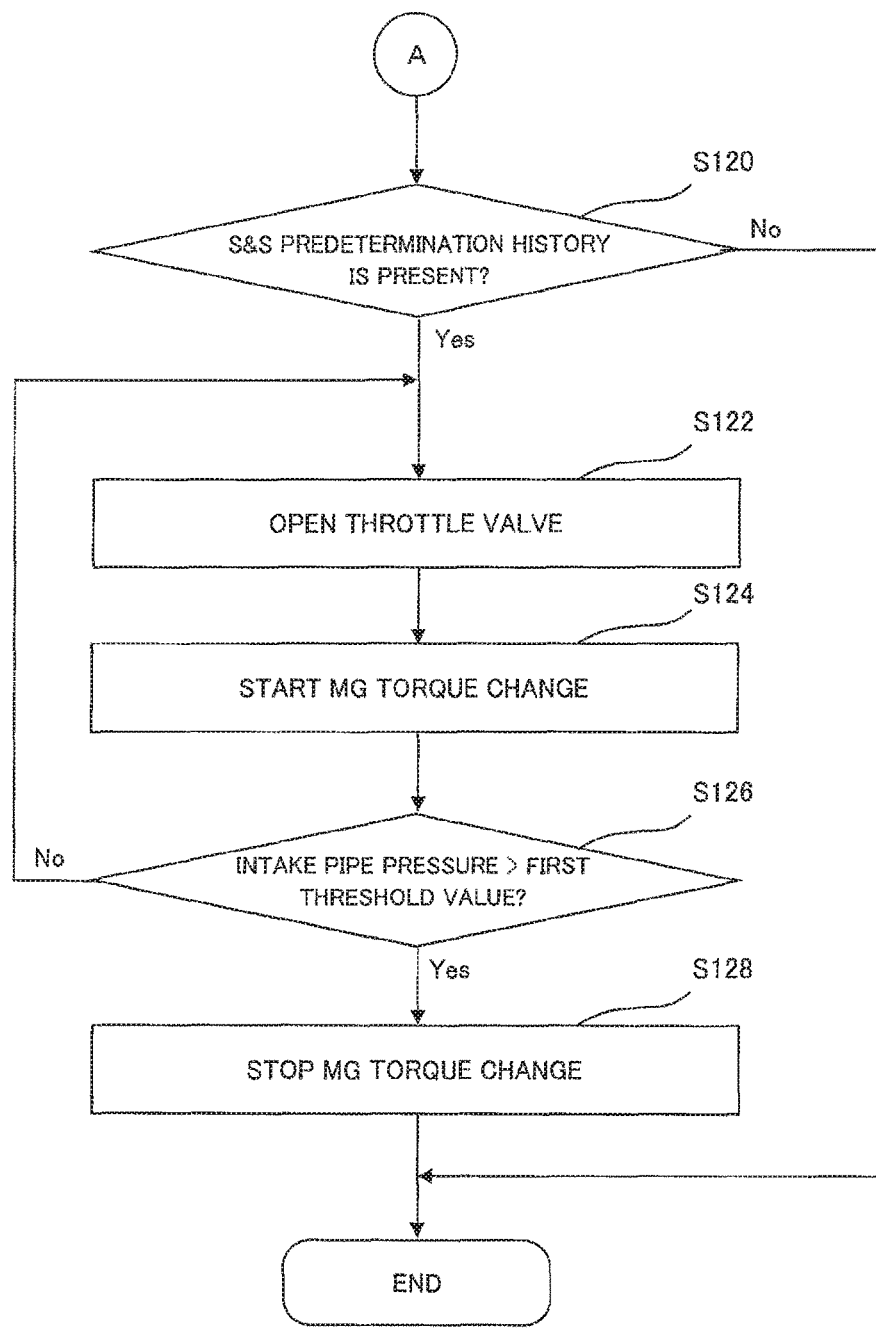
FIG. 6 is a flowchart illustrating a latter half part of the routine for the S&S control that is executed by the ECU of the first embodiment of the present disclosure.

Meanwhile, when it is determined that the result of the S&S predetermination is negative in step S102 described above, the flow goes to step S120 in a routine illustrated in FIG. 6. In step S120, it is determined whether or not a history of the result of the S&S predetermination being affirmative is present in the present routine. When it is determined that the history is not present as a result, a problem of reduction in the intake pipe pressure does not arise, and therefore the present routine is ended quickly. When it is determined that the history is present, it is determined that the result of the S&S predetermination changes to negative from affirmative, and the flow goes to subsequent step S122. In step S122, the throttle valve 24 is opened to return the reduced intake pipe pressure to an original pressure. Further, in subsequent step S124, MG torque change by drive of the MG 30 is performed to supplement torque that is outputted from the engine.

In subsequent step S126, it is determined whether or not the intake pipe pressure that is detected by the intake pipe pressure sensor 54 is larger than the predetermined first threshold value. When establishment of the intake pipe pressure>the first threshold value is not recognized as a result, it is determined that the MG torque change by the MG 30 is determined as necessary, and the flow goes to the processing in step S122 again. Meanwhile, when establishment of the intake pipe pressure>the first threshold value is recognized, it is determined that stable torque control by the engine is possible, and the flow goes to subsequent step S128. In step S128, the MG torque change by drive of the MG 30 is stopped, and the present routine is ended.

By performing the S&S control in accordance with the routine described above, the intake pipe pressure can be reduced prior to establishment of the automatic stop conditions. Thereby, occurrence of vibration and noise at the time of the engine being stopped is restrained, and worsening of fuel efficiency can be prevented. Further, in the S&S control, torque can be supplemented by drive of the MG 30 even if the engine changes to accelerate after the intake pipe pressure is reduced prior to establishment of the automatic stop conditions, so that it becomes possible to prevent worsening of drivability by preventing delay in response.

Incidentally, the present disclosure is not limited to the aforementioned embodiment, and can be carried out by being variously modified within the range without departing from the gist of the present disclosure. For example, in the aforementioned first embodiment, the throttle valve 24 is closed to full closure when the S&S predetermination is affirmative. However, the operation of the throttle valve 24 in this case is not necessarily limited to the operation of closing the throttle valve 24 to full closure, but the throttle valve 24 may be operated to the closing side so as to reduce the intake pipe pressure within the range in which combustion does not become unstable. This similarly applies to a controller of a second embodiment that will be described later.

Note that in the aforementioned first embodiment, the ECU 50 corresponds to a "controller" in the above described first disclosure. The MG 30 corresponds to an "electric driving machine" in the above described first disclosure. The automatic stop conditions correspond to a "first condition" in the above described first disclosure. The condition of the S&S predetermination corresponds to a "second condition" of the above described first disclosure.

Second Embodiment

Next, the second embodiment of the present disclosure will be described. The second embodiment according to the present disclosure can be realized by causing the ECU 50 to execute a routine illustrated in FIG. 8 that will be described later by using the hardware configuration illustrated in FIG. 1.

[Feature of Second Embodiment]

In the S&S control of the first embodiment mentioned above, the throttle valve 24 is closed in response to the fact that the S&S predetermination is affirmative, and F/C is performed by receiving the subsequent stop request. In contrast with this, S&S control of the second embodiment has a feature in an operation of performing F/C before receiving a stop request.

Figure 7:
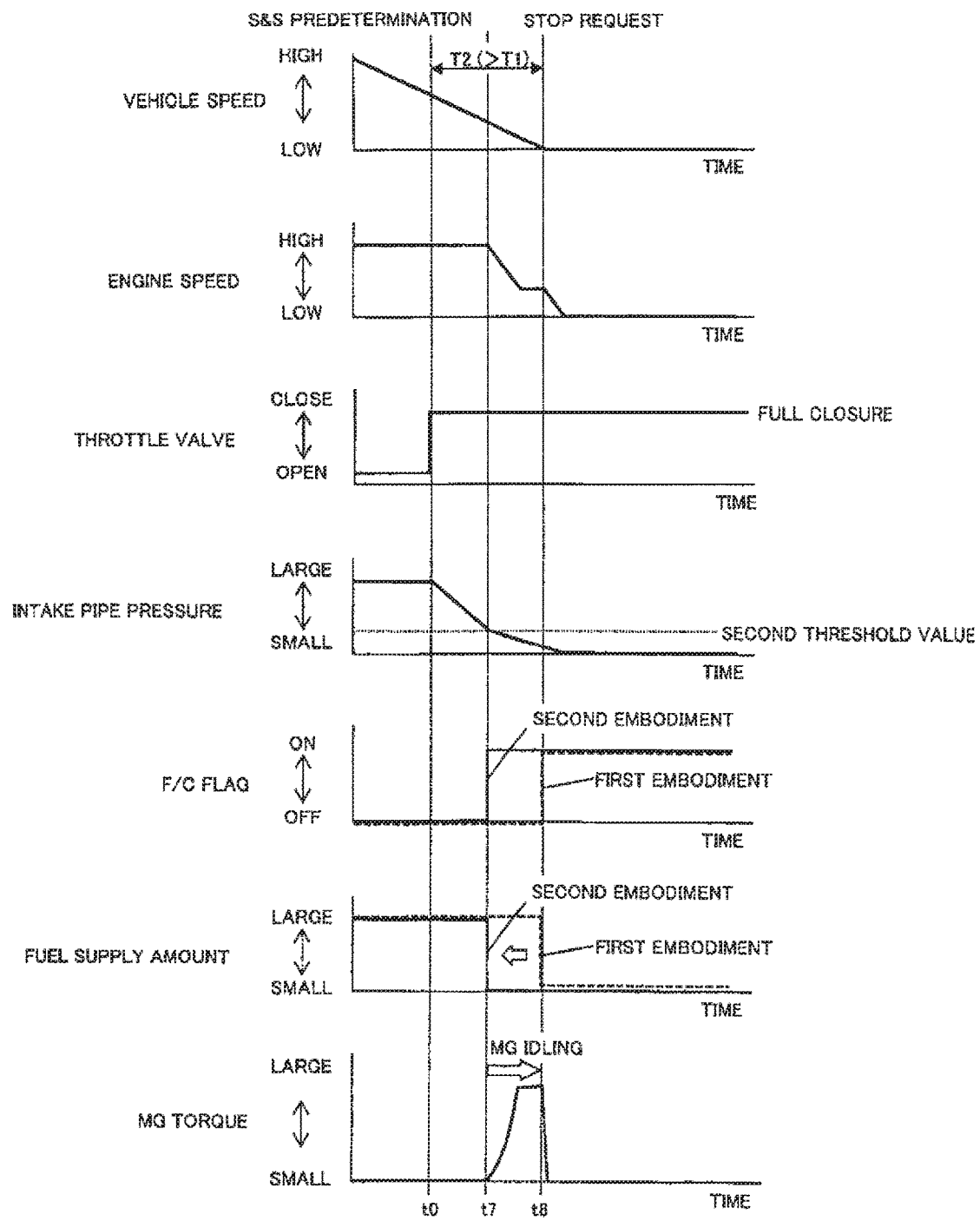
FIG. 7 is a time chart illustrating an operation of S&S control of a second embodiment of the present disclosure.

FIG. 7 is a time chart illustrating an operation of the S&S control of the second embodiment of the present disclosure. In FIG. 7, a chart on a first row illustrates a temporal change of a vehicle speed of a vehicle, a chart on a second row illustrates a temporal change of an engine speed, a chart on a third row illustrates a temporal change of a closing degree of the throttle valve, a chart on a fourth row illustrates a temporal change of an intake pipe pressure, a chart on a fifth row illustrates a temporal change of a F/C flag, a chart on a sixth row illustrates a temporal change of a fuel supply amount, and a chart on a seventh row illustrates a temporal change of torque of the MG 30, respectively.

As illustrated in FIG. 7, in the S&S control in the second embodiment, the throttle valve 24 is closed at a time point t0 at which S&S predetermination is determined as affirmative. Note that in the S&S predetermination of the second embodiment, it is set as an S&S predetermination condition that automatic stop conditions are established after a predetermined time period T2 (>T1). Consequently, in the S&S control of the second embodiment, an intake pipe pressure at a time of stop request have a smaller value, that is, a value of more negative pressure than the intake pipe pressure at the time of stop request in the S&S control of the first embodiment. As described above, when the intake pipe pressure is reduced, combustion easily becomes unstable. Consequently, when combustion becomes unstable and the engine stops before a stop request is issued, travel of the vehicle, drive of the auxiliary machines and the like are influenced.

Thus, in the S&S control of the second embodiment, at a time point t7 at which the intake pipe pressure is reduced to a second threshold value before the stop request, F/C is executed, and MG idling that keeps idling of the engine by the MG 30 is performed. Note that the second threshold value is set at a limit value of the intake pipe pressure that enables stable combustion. Subsequently, at a time point t8 at which the stop request is issued, MG idling is stopped.

According to the S&S control described above, F/C can be executed prior to a stop request, and therefore, further improvement of fuel efficiency can be achieved. In ordinary idling, an idling engine speed is set at approximately 700 rpm due to concern about vibration and an engine stall. However, in MG idling, there is less concern about vibration because the intake pipe pressure is in a low state, and in the MG 30 with high responsiveness, concern about a stall is low. Consequently, in MG idling, it is preferable to set the idling engine speed at a predetermined engine speed that is lower than an ordinary idling engine speed. Thereby, further enhancement of fuel efficiency can be achieved.

[Specific Processing in Second Embodiment]

Figure 8:
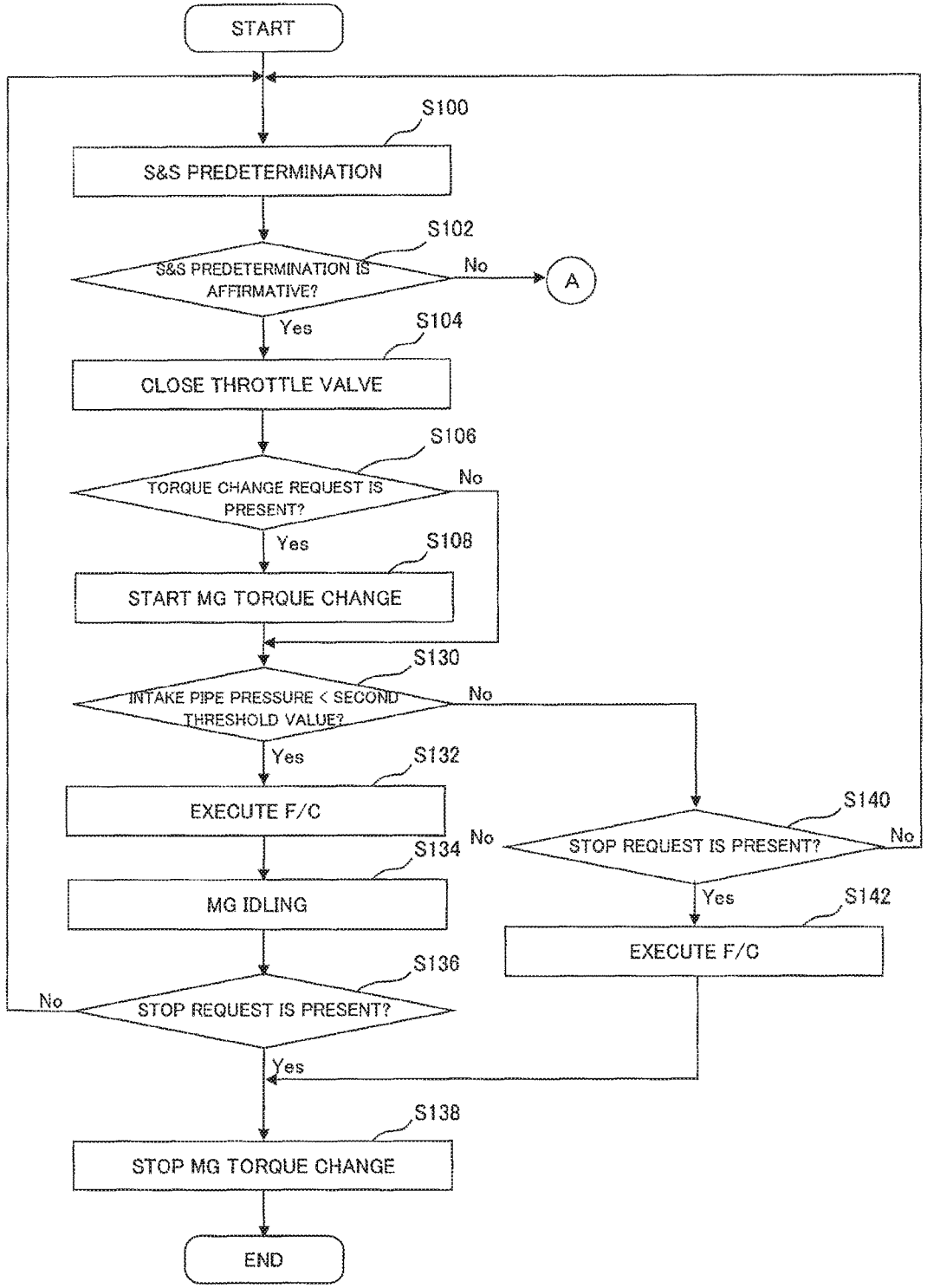
FIG. 8 is a flowchart illustrating a routine for the S&S control that is executed by an ECU of the second embodiment of the present disclosure.

Next, specific processing in the S&S control in the second embodiment described above will be described in detail with use of a flowchart. FIG. 8 is a flow chart illustrating a routine for the S&S control that is executed by the ECU 50 in the second embodiment of the present disclosure.

From step S100 through step S108 in the routine illustrated in FIG. 8, processing similar to the processing in step S100 through step S108 illustrated in FIG. 5 is executed. When it is determined that a torque change request is not present in the processing in step S106, or when the processing in step S108 is executed, the flow goes to step S130 next. In step S130, it is determined whether or not the intake pipe pressure that is detected by the intake pipe pressure sensor 54 is smaller than the second threshold value. When establishment of the intake pipe pressure<the second threshold value is recognized as a result, it is determined that there is a fear of combustion of the engine being unstable, and the flow goes to subsequent step S132. In step S132, F/C is executed. Further, in subsequent step S134, the MG 30 is driven, and MG idling is performed. Here, MG idling is performed at the predetermined engine speed which is lower than the ordinary idling engine speed.

In subsequent step S136, it is determined whether or not a stop request is present. Here, specifically, it is determined whether or not the automatic stop conditions are established. When it is determined that the automatic stop conditions are not established yet as a result, the flow returns to step S100 again and the S&S predetermination is executed again. Subsequently, in processing in subsequent step S106 through S108, torque that is generated from the MG 30 during the MG idling is changed in response to a torque change request. When it is determined that the automatic stop conditions are established in step S110, the flow goes to subsequent step S138. In step S138, the MG torque change by drive of the MG 30 is stopped, and the present routine is ended.

When establishment of the intake pipe pressure<the second threshold value is not recognized in step S130 described above, it is determined that there is no fear of combustion of the engine becoming unstable, and the flow goes to subsequent step S140. In step S140, it is determined whether or not a stop request is present. Here, specifically, processing similar to the processing in step S136 described above is executed. When it is determined that the automatic stop conditions are not established yet as a result, the flow returns to step S100 again, and the S&S predetermination is executed again. When it is determined that the automatic stop conditions are established in step S140, the flow goes to subsequent step S142. In step S142, F/C is executed, and the flow goes to step S138 described above.

By performing the S&S control in accordance with the routine described above, the operation of reducing the intake pipe pressure and performing F/C can be performed prior to a stop request. Thereby, generation of vibration and noise at the time of engine stop is reduced, and improvement of fuel efficiency can be achieved. Further, in the S&S control, MG idling is performed at a low engine speed, and therefore further improvement of fuel efficiency can be achieved.

Note that in the aforementioned second embodiment, the ECU 50 corresponds to the "controller" of the above described first disclosure. The MG 30 corresponds to the "electric driving machine" of the above described first disclosure. The automatic stop conditions correspond to the "first condition" of the above described first disclosure. The condition of the S&S predetermination corresponds to the "second condition" of the above described first disclosure.

The controller included by the ECU 50 in each of the first and second embodiments may be configured as follows. The respective functions of the controller may be realized by a processing circuit. The processing circuit of the controller may include at least one processor and at least one memory. When the processing circuit includes at least one processor and at least one memory, the respective functions of the controller may be realized by software, firmware, or a combination of software and firmware. At least one of the software and the firmware may be described as a program. At least one of the software and the firmware may be stored in at least one memory. At least one processor may realize the respective functions of the controller by reading and executing a program stored in at least one memory. At least one memory may include a nonvolatile or volatile semiconductor memory or the like.

The processing circuit of the controller may include at least a piece of exclusive hardware. When the processing circuit includes at least a piece of exclusive hardware, the processing circuit may be a single circuit, a composite circuit, a programmed processor, a parallel-programmed processor, ASIC (Application Specific Integrated Circuit), FPGA (Field-Programmable Gate Array) or a combination of them. Functions of the respective sections of the controller may be realized by processing circuits respectively. The functions of the respective sections of the controller may be collectively realized by a processing circuit. A part of the respective functions of the controller may be realized by exclusive hardware, and the other part may be realized by software or firmware. The processing circuit may realize the respective functions of the controller by hardware, software, firmware or a combination of them.

What is claimed is:

1. A control apparatus for a diesel engine, comprising:
a diesel engine having a throttle valve disposed in an intake passage and a fuel injection valve that supplies fuel into a cylinder;
an electric driving machine that assists in drive of the diesel engine; and
a controller configured to:
stop the diesel engine automatically when a first condition for automatically stopping the diesel engine is established during an operation of the diesel engine,
operate the throttle valve to a closing side in response to establishment of a second condition that is established prior to establishment of the first condition, and
stop supply of fuel by the fuel injection valve in response to subsequent establishment of the first condition,
wherein the second condition is a condition that is established when the first condition is determined to be established after a predetermined time period.

2. The control apparatus for a diesel engine according to claim 1,
wherein the predetermined time period is a time period that is required until an intake pipe pressure becomes a predetermined negative pressure after the throttle valve is operated to the closing side.

3. The control apparatus for a diesel engine according to claim 1,
wherein the controller is configured to control torque in a period until the first condition is established after the second condition is established by the electric driving machine.

4. The control apparatus for a diesel engine according to claim 1, wherein, when the second condition changes to be non-established in a period until the first condition is established after the second condition is established, the controller is configured to:
operate the throttle valve to an opening side, and
drive the electric driving machine until an intake pipe pressure reaches a first threshold value.

5. The control apparatus for a diesel engine according to claim 1, wherein, when an intake pipe pressure becomes lower than a second threshold value in a period until the first condition is established after the second condition is established, the controller is configured to:
stop supply of fuel by the fuel injection valve, and
drive the electric driving machine to keep the diesel engine at a predetermined engine speed.

6. The control apparatus for a diesel engine according to claim 5,
wherein a value of the predetermined engine speed is smaller than a value of an idling engine speed in an operation of the diesel engine.

* * * * *